Jan. 9, 1940. W. HALPERN 2,186,335
SANITARY DOUGH SHAPER
Filed July 23, 1938
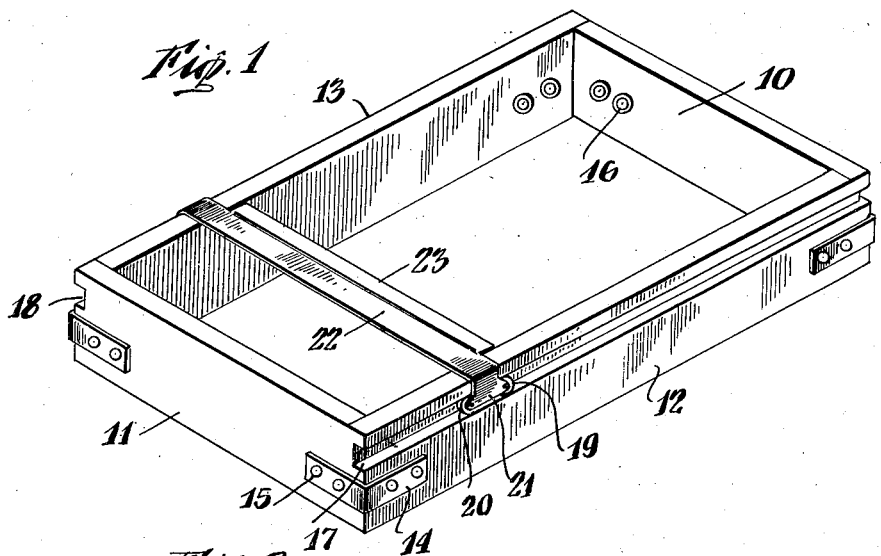
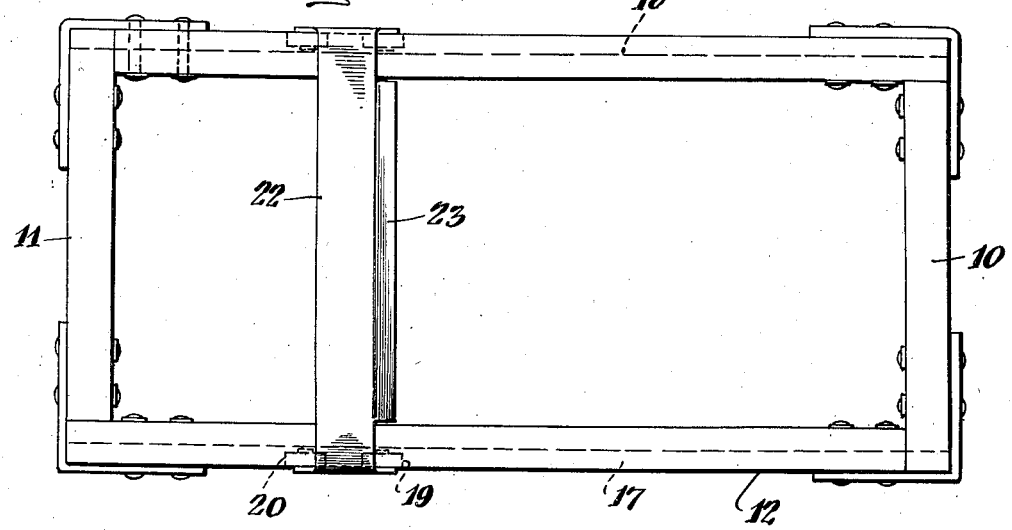
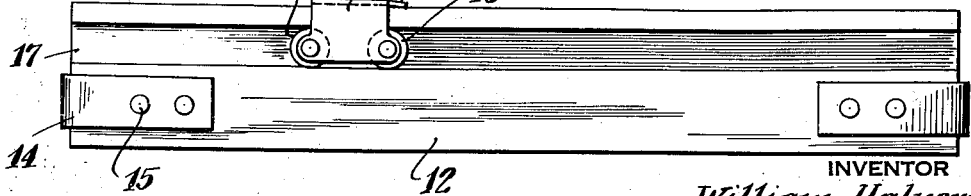
INVENTOR
William Halpern
BY
ATTORNEY Patented Jan. 9, 1940

2,186,335

UNITED STATES PATENT OFFICE 2,186,335

SANITARY DOUGH SHAPER

William Halpern, New York, N. Y.

Application July 23, 1938, Serial No. 220,843

3 Claims. (Cl. 107—19)

This invention relates to improvements in bakery receptacles or molds to be used in the forming of dough shapes preparatory to baking bread or other similar articles in the baking line, and it is the principal object of my invention to provide a substantially rectangular frame the end and side walls of which are held together at their meeting corners by sanitary bands and rivets, particularly such made of aluminum.

According to my practical experience in the trade the health authorities invariably object to the use of metals which are liable to become easily rusty or develop verdigris under the influence of the humidity developed and present during the preparation of the dough, and thus are liable to seriously impair the sanitary conditions in bakeries, etc., and to lead to ailments amongst the users and consumers of such pastry or the like bakeware.

My invention avoids this disadvantage by the use of a material which is positively rust-free and free from oxidation, and thus presents a mold which is perfectly sanitary and one which will successfully pass any, also the most severe inspection. Another object of my invention is the provision of a bakery mold, the frame of which is equipped with a suitable means to remove the surplus of dough happening to be filled into the mold.

A further object of my invention is the provision of a bakery mold which is simple in its construction and economical in its use, yet durable, and highly efficient in operation.

A still further object of my invention is the provision of a sanitary bakery mold equipped with outer and inner corner pieces made of a sanitary material to produce a strong and readily operating article of manufacture.

These and other objects and advantages of my invention will become more fully known as the description thereof proceeds, and will then be more specifically defined in the appended claims.

In the accompanying drawing forming a material part of this disclosure:

Fig. 1 is a perspective view of a bakery mold constructed according to my invention.

Fig. 2 is a top plan view thereof.

Fig. 3 is a side elevation of the mold.

As illustrated, the end walls 10, 11 and side walls 12, 13 of the mold are held together at their meeting ends or corners by the outer aluminum angle pieces 14 held in place by aluminum rivets 15 or the like securing the angle pieces to the outer faces of the end and side walls. Likewise these rivets have inner rust-proof heads 16 or the like. Grooves 17, 18 are formed in the side walls in which rollers 19, 20 also of a rust-proof material are displaceably mounted at the ends of the angularly downwardly bent ends 21 of cross-bars 22 equipped at their front edges with the wipers 23 for the removal of surplus dough.

The operation of my mold will be readily evident from the above description by simultaneous reference to the drawing, and it will be clear that a perfectly sanitary mold has been produced as all the metal parts are rust-proof and which will evidently pass the most severe inspection by health departments, etc., and which by the ready operation of the wipers on the reciprocating cross-bars on wheels, will remove all surplus of dough from the mold thus saving the cost of material, etc.

It will be understood that I have disclosed the preferred form of my invention as one example only of the many possible ways to practically construct the same, and that I may make such changes in its general arrangement, and in the construction of the minor details thereof as come within the scope of the appended claims without departure from the spirit and principle of the invention.

Having thus described my invention what I claim as new and desire to secure by Letters Patent is:

1. A sanitary dough shaper for bread baking including side and end walls constituting a frame containing the dough, rust-proof angle pieces and rivets connecting said side and end walls, said side walls being grooved, rollers displaceable in said grooves and means to operate said rollers to move to and fro in their grooves, said means equipped with wipers for the removal of any surplus dough.

2. A sanitary dough shaper for bread baking including side and end walls constituting a frame containing the dough held together by rust-proof angle pieces and rivets, said side walls being grooved on their outer faces, rollers displaceable in said grooves, depending bearings for said rollers, and a cross-bar connecting said depending bearings, and a wiper on said cross-bar for the removal of any surplus dough.

3. A sanitary dough shaper for bread baking including grooved side walls, end walls connecting said side walls constituting a frame containing the dough, and angle pieces connecting side and end walls of the mold at the corners and secured by rivets, said angle pieces and rivets being of rust-proof material, rollers running in said grooves, a cross-bar having depending flanges constituting bearings for said rollers, and a wiper on said cross-bar to remove any surplus dough.

WILLIAM HALPERN.